US011757848B1

(12) United States Patent
Zieh et al.

(10) Patent No.: US 11,757,848 B1
(45) Date of Patent: Sep. 12, 2023

(54) CONTENT PROTECTION FOR DEVICE RENDERING

(71) Applicant: Amazon Technologies, Inc., Reno, NV (US)

(72) Inventors: Jan Zieh, Redmond, WA (US); Musachy Barroso, Madrid (ES); Lokesh Joshi, Bellevue, WA (US); Mark David Van Hamersveld, Seattle, WA (US); Jeffrey Gerard Rodrigues, Bellevue, WA (US); Mohammad A. Kanso, Seattle, WA (US); Manigandan Natarajan, Redmond, WA (US); Sriram Subramanian, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 30 days.

(21) Appl. No.: 17/356,069

(22) Filed: Jun. 23, 2021

(51) Int. Cl.
*H04L 9/40* (2022.01)
*G06T 11/20* (2006.01)
*G06F 21/62* (2013.01)
*H04L 67/10* (2022.01)

(52) U.S. Cl.
CPC ...... *H04L 63/0428* (2013.01); *G06F 21/6218* (2013.01); *G06T 11/203* (2013.01); *H04L 63/102* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 8,209,544 | B2 * | 6/2012 | Maheshwari | G06F 21/80 713/193 |
| 9,477,836 | B1 * | 10/2016 | Ramam | H04W 12/02 |
| 2006/0017733 | A1 * | 1/2006 | Matskewich | G09G 5/246 345/467 |
| 2013/0002680 | A1 * | 1/2013 | Cornell | G06F 40/109 345/467 |
| 2013/0304604 | A1 * | 11/2013 | Hoffman | G06Q 30/0621 705/26.5 |

* cited by examiner

*Primary Examiner* — Brandon Hoffman
(74) *Attorney, Agent, or Firm* — Hogan Lovells US LLP

(57) ABSTRACT

Users access content using a variety of formats, where some formats provide stronger encryption or protections than others. Content transmitted over open protocols may expose content to unauthorized third parties or enable unauthorized use of the content. The content may be protected by converting the content to a set of instructions on a user device, where the instructions correlate characters to identifications and outlines of the characters with instructions for rendering the characters. Different segments of content may have different mappings between characters, identifications, and outlines to add time or resource use to attempts to reverse engineer the instructions.

20 Claims, 9 Drawing Sheets

CONTENT PROTECTION FOR DEVICE RENDERING

BACKGROUND

As computing technology continues to advance, an increasing amount of content is being provided and consumed using electronic devices. Users may desire access to their content using a variety of different devices, and as a result, may access content that is stored within a cloud environment. The content may be subject to different restrictions or security requirements, so transmission as plain text or as formatting or stylized text or images may be undesirable because third parties may obtain access to the content or an authorized user may make an unauthorized reproduction. As a result, it is desirable to protect content that is transmitted from a cloud system.

BRIEF DESCRIPTION OF THE DRAWINGS

Various embodiments in accordance with the present disclosure will be described with reference to the drawings, in which.

DETAILED DESCRIPTION

Figure 1:
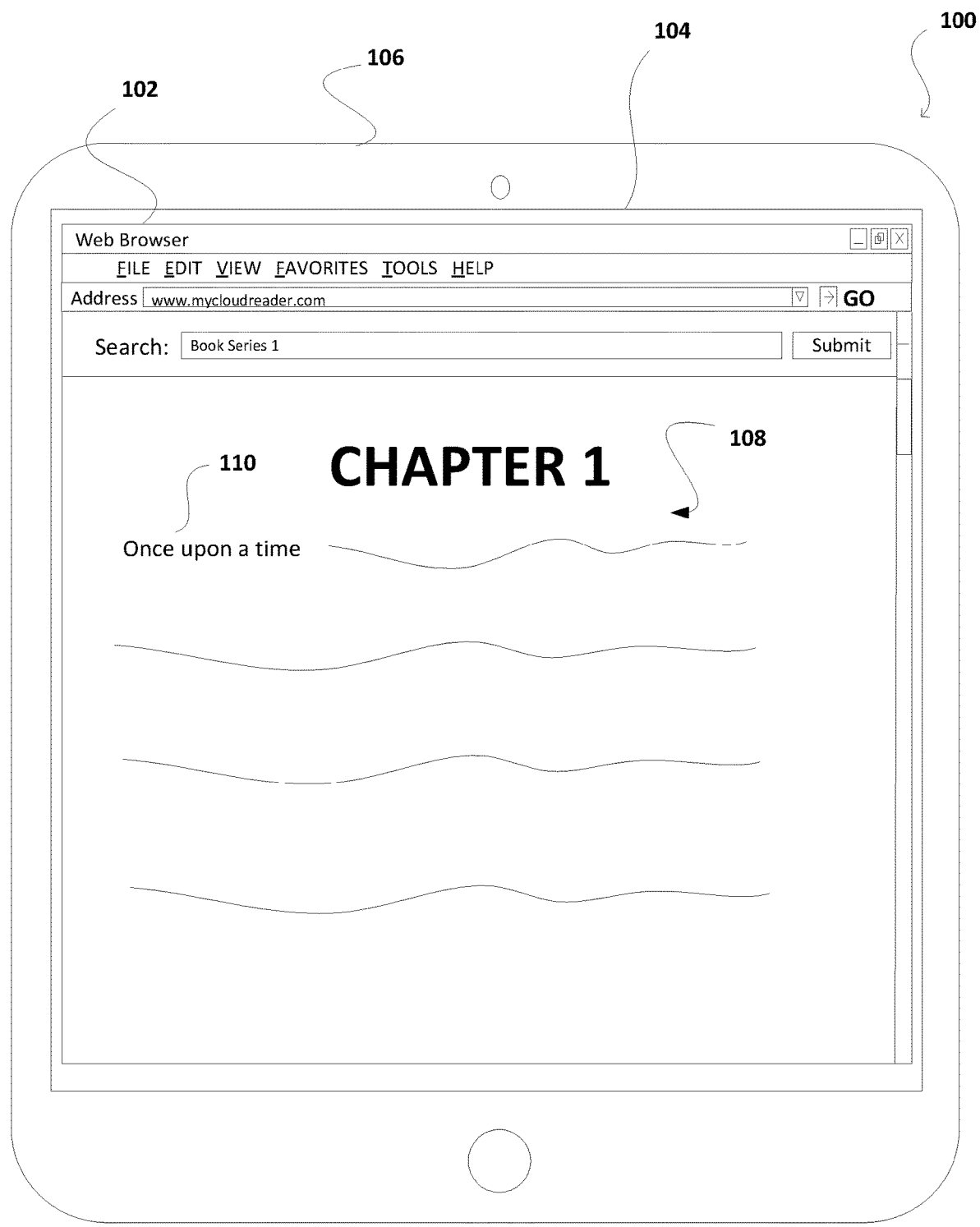
FIG. 1 illustrates an example interface that can be provided for display in accordance with various embodiments.

Approaches in accordance with various embodiments provide for multi-level content protection. In particular, content that is stored within a distributed environment, such as a cloud system, may be provided such that users can consume the content using a variety of different devices or viewing methods while still protecting the integrity of the content. Accordingly, content may be presented to the user as a set of instructions for generating a visual representation of the content to prevent transmission of the content itself along with associated layout or style information. Thereafter, the user's device may receive instructions for rendering the content. In at least one embodiment, various levels of protection (e.g., encryption, obfuscation, etc.) may be applied to the content to prevent or increase the difficulty of unauthorized access or reproduction.

In various embodiments, a user may request content from a provider, such as a cloud service hosted by the provider. If the user is authorized to access the information, data may be transmitted to the user that represents the content. By way of example, the content may be textual content, such as a book or magazine, that the user wants to read. The user can access this content from a variety of different devices, such as a smartphone, a dedicated e-reader, a computer system using a web browser, a wearable device, or various other user devices. For browser related data, it may be undesirable to send the content in a manner where the text is visible, such as within HTML code where the user or a third party would be able to inspect the webpage, locate the text and styling or layout information, and then extract the text along with the style and layout. Systems and methods are directed toward transmission of instructions for rendering the content on the user device, where the instructions may include at least instructions related to a position of the content (e.g., characters of the text) and instructions for drawing or rendering the content (e.g., a mathematical formula for rendering the content, a path for rendering the content). In this manner, the text itself it not transmitted in favor of transmitting instructions to enable the user device to render the text. Moreover, users may access the content without downloading a separate dedicated application or a large content file, which may improve their experience and reduce resource or bandwidth use.

In at least one embodiment, systems and methods are directed to multi-level techniques that enable protection of content, such as protection from unauthorized reproduction. For example, content may be encrypted prior to transmission, where a key for decrypting the content may include information associated with the user device requesting the content, a user account associated with the content, or the like. Furthermore, various embodiments may include additional levels of protection in the event the encryption is broken or the user attempts an unauthorized reproduction of the content. For example, when referring to textual content, each character may be assigned a corresponding glyph identification (e.g., glyph ID) for that character. The glyph ID may be associated with instructions for rendering the content, such as instructions for "drawing" or "painting" the content on the screen, which may correspond to instructions for a scalable vector graphic (e.g., SVG path). Accordingly, the user may receive a series of glyph IDs associated with the content and then render the content based on the glyph IDs. As a result, access to the instructions themselves would still fail to yield the actual text being rendered without further processing.

In at least one embodiment, further methods may be deployed to increase a difficulty of unauthorized reproduction or unauthorized access. By way of example only, content may be divided into segments, where glyph IDs for different characters are randomly assigned for different sections. Accordingly, a third party would need to identify glyph IDs for individual characters for each segment of the content, thereby increasing time and resources for reproduction. In one or more embodiments, the glyph IDs may be randomly generated for the characters within the segments. In at least one embodiment, a set of glyph IDs may be generated for specific characters and one or more glyph IDs, from the set, may be selected for the segments. As another example, SVG paths for the rendering instructions may also be modified, such as by adding noise to the paths. Adding noise to the paths then prevents a third party for identifying characters by path. For example, the noise may not change the appearance of the rendered text, but the instructions for rendering will appear different. In one or more embodiments, noise is randomly generated for each path. In at least one embodiment, a set of paths may be generated and one or more paths, from the set, may be selected for the segments. It should be appreciated that these systems may be utilized together to provide multiple layers of protection to content.

One or more embodiments may also be directed toward applying additional layers of encryption (e.g., Advanced Encryption Standard) by using a Web Crypto API associated with a browser. For example, encryption may be hidden within JavaScript code and memory of the device. While browsers and web browsing may be built on open platforms, such as system may deter casual users and at least provide further barriers for other users wishing to access the transmitted data, which may provide a deterrent in terms of time and resource use.

In at least one embodiment, systems and methods may be directed toward transmission of content that includes textual elements, but it should be appreciated that the content may also include images, videos, and the like. Furthermore, various embodiments may also include additional rendering instructions based, at least in part, on the user's device (e.g., screen size, screen resolution, bandwidth, processing capabilities, etc.). In embodiments, the content may refer to a variety of different content types, including but not limited to rights-protected content (e.g., books, textbooks, magazines, subscription-based services, etc.), sensitive information (e.g., medical records, banking information, personal records, classified information), and the like. In one or more embodiments, packaging and protecting may be performed on a server side, hosted by a provider, while the rendering is performed on the device. It should also be appreciated that a standalone service may be provided where a host or provider transmits the data to the service prior to transmission to the user.

FIG. 1 illustrates an example interface 100 that corresponds to a web browser 102 on a display 104 of a client device 106 (e.g., user device, device, etc.). Examples of such client devices include personal computers, smart phones, handheld messaging devices, laptop computers, set-top boxes, personal data assistants, electronic book readers, wearables, headsets, and the like. In this example, the user has selected the web browser 102 for viewing content 108 on the device 106, where the content corresponds to a book that includes text 110. It should be appreciated that a dedication application on the client device 106 may also be utilized for consuming the content 108. Various web browsers 102 may present content using HTML, which may include cues for the appearance of the content, and moreover, may include the actual text of the content 108. For example, when content 108 is delivered to the browser, it may be transmitted over a connection (e.g., HTTPS), may be stored or processed within JavaScript memory to prepare for rendering, may be decrypted and rendered, and then presented on the device alone with one or more tools to support additional functionality. A user may obtain access to the actual elements of the web page displaying the content 108, which may include the text 110 along with layout or formatting information that can be easily copied and then reproduced in another format, such as within a text document. This access is undesirable for protected content, such as content with a rights holder that may grant access to the content in exchange for compensation. As a result, transmission of the content 108 via HTML may lack effective security or anti-piracy capabilities. While users may select to use a dedicated application for viewing the content 108, it may be more convenient for a user to utilize the web browser 102 and/or the user may simply choose the web browser 102 in certain circumstances. Embodiments of the present disclosure are directed toward systems and methods for applying one or more layers of protection and/or security to the content 108 that enables secure transmission of instructions for rendering the content 108 on the device 106. It should be appreciated that while embodiments may be discussed with reference to web browsers with HTML transmission, other forms of viewing content may also utilize one or more systems and methods of the present disclosure, such as dedicated content viewing applications and the like.

Figure 2A:
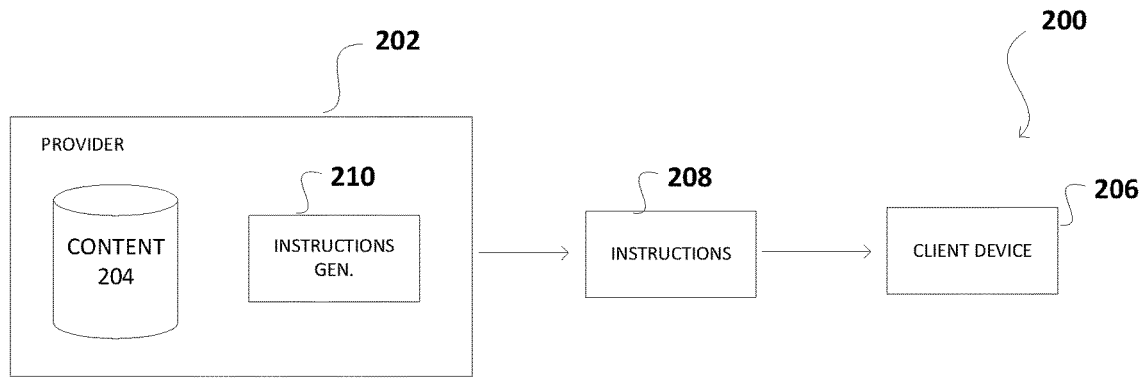
FIG. 2A illustrates an example environment for providing rendering instructions to a client device in accordance with various embodiments.

FIG. 2A is a schematic representation of a content transmission environment 200 where a provider 202 provides content 204 to a client device 206. The content 204 is rendered or prepared for viewing as a set of instructions 208 via an instruction generator 210. For example, content 204 may be identified and then a set of instructions 208 for rendering the content 204 on the device 206 may be transmitted. By way of example only, transmission of the content may be provided within the Karamel format such that text of the content 204 is not presented as Unicode codepoints, but rather as glyph IDs where each glyph ID is associated with a sequence of glyph outlines (e.g., drawing commands, paths, etc.). It should be appreciated that the instructions may be generated and transmitted in real time or near real time (e.g., without significant delay) or may be prepared and stored prior to a user request. For example, popular content may be prepared with instructions corresponding to likely or popular settings and then transmitted upon receipt of a request from a user. Accordingly, it should be appreciated that systems and methods described herein may be performed online, responsive to a user request, or may be performed offline. Offline processing may include specific processing for one or more settings, such as settings for a device having a certain resolution or presentation using a particular font.

Utilizing glyph IDs and paths may be useful for reducing transmission of the exact text when using HTML or other protocols, but malicious third parties, unauthorized users, or authorized users looking to exceed their rights to the content may still access the data with sufficient time and resources. By way of example, the glyph IDs may be analyzed against the rendered content to recreate the mapping, allowing for reproduction of the text. Additionally, the paths could be analyzed against the rendered content to recreate the mapping. While this may provide the content itself, transmission using the glyph IDs may be useful for removing the formatting or layout style of the content, which may be desirable for the user. Systems and methods of the present disclosure may be deployed to reduce the likelihood of such behaviors and/or increase the time or resource consumption of such behaviors.

Figure 2B:
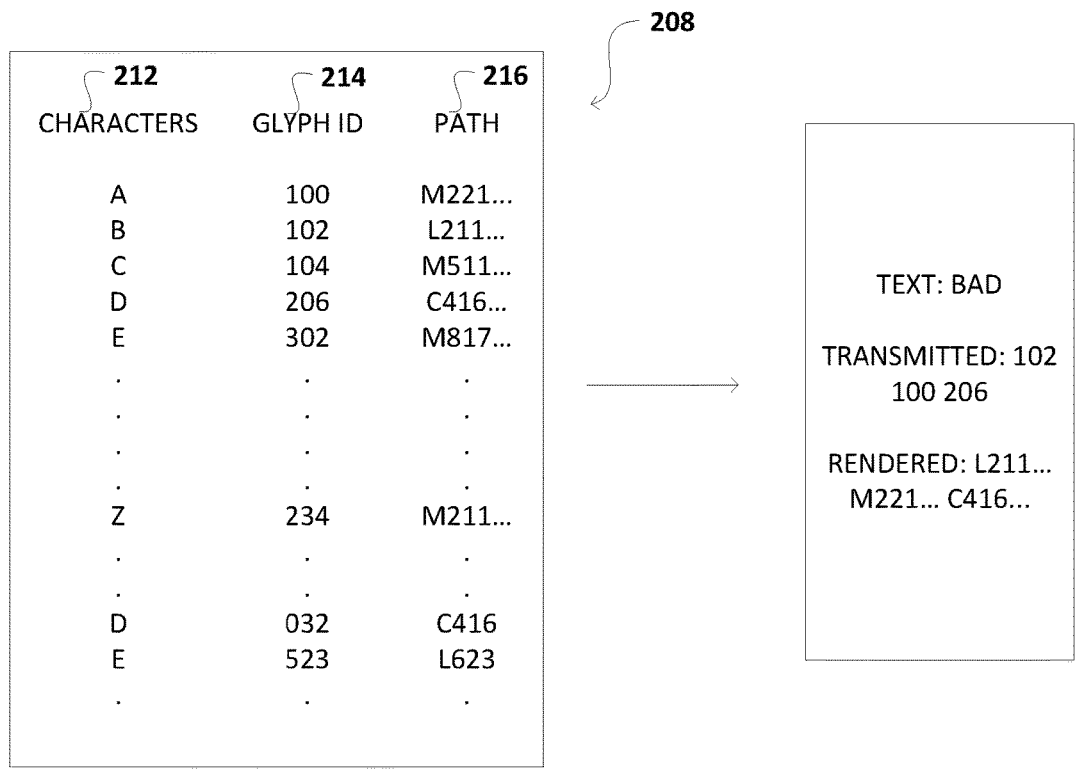
FIG. 2B illustrates an example set of rendering instructions in accordance with various embodiments.

FIG. 2B illustrates the instructions 208 including a table illustrating a character 212 to glyph ID 214 to path 216 mapping. It should be appreciated that the table is a simplified version provided for simplicity and clarity with the present instruction. As illustrated in this example, each character 212 includes a unique glyph ID, which also has a unique path corresponding to instructions for drawing or rendering the character on a display. By way of example, the character "A" has a glyph ID of 100 and the path being at M221, illustrating a move command. It should be appreciated that different IDs and paths may correspond to different properties of the table such that different tables may be generated for different fonts, different sizes, and the like. Moreover, glyph IDs may be arbitrarily provided and assigned. These instructions 208 may be utilized by the client device 206 for rendering the content. As an example, the word "BAD" would corresponding to the glyph IDs 102, 100, 206, which each have their own respective paths for rendering the characters.

It should be appreciated that various embodiments of the present disclosure may also enable multiple glyph IDs 214 to be associated with a single character. In this example, the character "E" has a glyph ID of 302 and 523. Similarly, multiple paths 216 may also be associated with the characters, such as the path for "E" including both M817 and L623. Furthermore, different glyph IDs may reference the same path, in various embodiments. For example, the character "D" has a glyph ID of both 206 and 032, but both paths are C416. Moreover, it should be appreciated that the instructions 208 may be provided in a variety of different formats. For example, the instructions may be provided as a separate file that is transmitted and then utilized by the device for rendering. Additionally, the instructions, or portions thereof, may be incorporated into a font file or the like, which may be stored and then transmitted. By way of example, the internal contents of one or more portions of the font file may be modified and then the font file is transmitted along with the instructions, which may further obscure the instructions for rendering.

Figure 3:
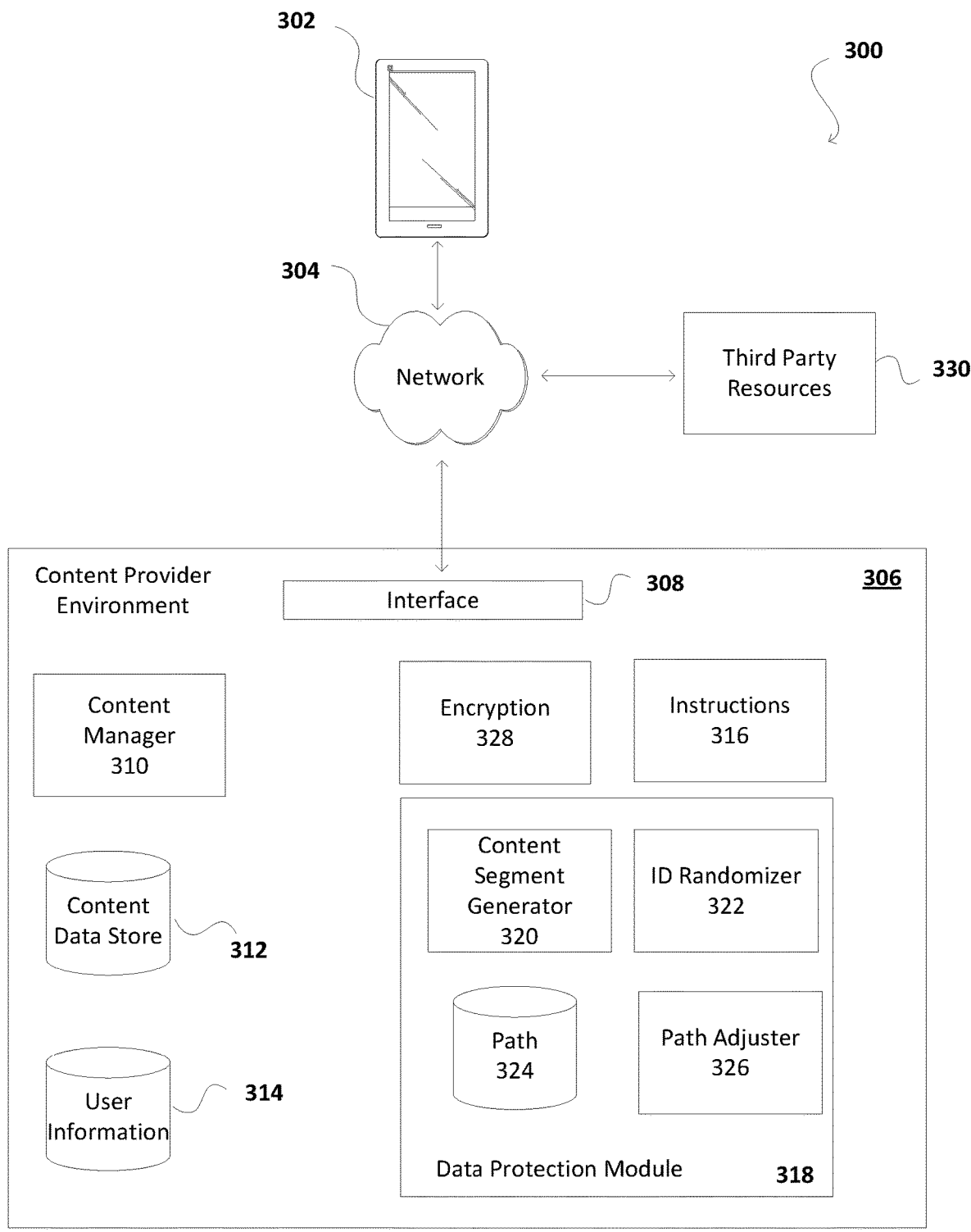
FIG. 3 illustrates an example content provider environment that can be utilized to implement aspects in accordance with various embodiments.

FIG. 3 illustrates an example environment 300 in which aspects of the various embodiments can be implemented. In this example, a computing device 302 is able to submit a query for information across one or more networks 304 to a content provider environment 306. The provider can provide an online store in some embodiments, where content may relate to products offered through the store. Additionally, in one or more embodiments, the content provider environment 306 may provide access to content stored for the user, where the user has a set of rights to access the content. The network(s) can include any appropriate network, such as the Internet, a local area network (LAN), a cellular network, an Ethernet, or other such wired and/or wireless network. The content provider environment 306 can include any appropriate resources for providing content from a resource provider, as may include various servers, data stores, and other such components known or used for providing content from across a network (or from the "cloud").

In this example, a request received to the content provider environment 306 can be received by an interface layer 308 of the environment. As known for network environments, the interface layer can include components such as interfaces (e.g., APIs), load balancers, request and/or data routers, and the like. If the request is a request for content, such as for content for a page to be displayed in an application, information for the request can be directed to one or more content managers 310 and/or content servers, which can check credentials for the requested content, and if found, obtain the content from a content data store 312 or other such repository to be sent back across the network(s) to the computing device. In some embodiments, information for the request might also be compared against user data in a user data store 314 or other such location to determine, for example, whether the user has access rights to the content, determine whether the user has a saved location within the content, determine whether the user has annotated the content, or to determine whether the user has stored settings for displaying the content, among other information.

In some instances, the request for content may include a determination regarding the device displaying the content or the way in which the device is displayed, such as determining whether or not the display is through a dedicated application or service for the content, which may include enhanced encryption or data protection parameters, or whether the content will be displayed through a web browser or the like. In at least one embodiment, an instructions generator 316 may generate a set of instructions for the device 302 to render the content for display. As will be appreciated, these instructions may be generated "sever-side" and as a result may remain within, and be controlled within, a trust boundary of the content provider environment 306. In one or more embodiments, the instructions generator 316 may utilize the device information, such as a type of web browser being used, device capabilities, etc. when generating the instructions for rendering the content. As noted above, in one or more embodiments, instructions may include glyph IDs for identifying various characters forming at least a portion of the content and paths for respective characters to enable rendering on the device 302. In at least one embodiment, the paths may correspond to SVG paths.

A data protection module 318 may be utilized to transmit the content back to the device 302 and/or to adjust the instructions of the instruction generator 316. The data protection module 318 may include, or be associated with or have access to, one or more processors or memories that store machine-readable instructions for execution by the one or more processors. The instructions may correspond to algorithms including a logical set of instructions for performing one or more tasks. By way of example, the tasks may correspond to identifying the content, determining the display parameters, segmenting the content, generating random glyph IDs for different segments, and modifying path parameters for rendering of the content.

The illustrated data protection module 318 includes a content segment generator 320, an ID randomizer 322, a path data store 324, and a path adjuster 326. In at least one embodiment, the content segment generator 320 may be used to separate or divide the content, or portions of the content, into various segments. For example, the content may be related to text, such as a book, that includes a number of pages. The content segment generator 320 may determine that a certain number of pages, a percentage of content, or the like corresponding to a particular segment. It should be appreciated that the segments may be particularly selected and may vary across the content. For example, the segments may be based, at least in part, on a chapter or section length. Moreover, content layout or formats may also drive sections, such as headings and subheadings within the text. Furthermore, the number of segments may vary and be particularly selected based on one or more factors, such as a security level of the content, user preferences, and the like. A higher level or security and potential time/resource consumption may be associated with a larger number of content segments, but generation of those segments may involve greater resources too.

The segments generated by the content segment generator 320 may then each include an independent set of glyph IDs for the characters within that segment. These glyph IDs may be generated and randomized by the ID randomizer 322. By way of example, the ID randomizer 322 may utilize one or more programs or algorithms to generate random numbers that correspond to different characters associated with the content. In at least one embodiment, the IDs may be sequential where a starting number, ending number, or some intermediate number is a randomly generated number. In at least one embodiment, each glyph ID for each character is randomly generated. In at least one embodiment, portions of the glyph IDs for portions of the characters are randomly generated and the remaining glyph IDs are sequential. Segmenting the content portion, along with providing the randomized glyph IDs within segments, provides a further barrier to unauthorized use of the content because an attacker would use time and resources for each content segment in order to properly reproduce the entirety of the content.

In one or more embodiments, a set of glyph IDs may be generated and then stored for each of the characters, where one or more glyph IDs for the set are selected or used for each of the segments. By way of example, a predetermined number of glyph IDs may be assigned to different characters. When that character is used within a segment, one or more of the predetermined numbers may be selected and used within that segment. Such a process may enable offline populating of different sets of glyph IDs and then pre-processed or on-demand selection of glyph IDs within segments.

In one or more embodiments, the data protection module 318 also includes the path data store 324 that may store different sets of instructions for rendering characters. By way of example, the path data store 324 may include instructions for rendering characters based, at least in part, on a font, a text size, a screen resolution, rendering software, and the like. Additionally, multiple versions for a particular font or text size may also be included. In various embodiments, one or more font files may also be stored, where the font file may correspond to instructions for rendering characters in a certain font and/or at a certain size. The path data base 324 may include the instructions corresponding to a set of steps for drawing or rendering characters, such as where to position a point, how long to make a line, how to draw a curvature, and the like. The path adjuster 326 may access paths and/or font files for a given set of instructions and then apply one or more modifications to the path for inclusion within the instructions. The modifications may be noise or changes in how the characters are rendered. In certain embodiments, the changes or adjustments may not visually change the appearance of the text, but may change the path to prevent analysis of the path with respect to mapping a certain path to a character. By way of example, the path adjuster 326 may add a phantom move to the path, where a move command (M) is included to a first location and followed (subsequently or after additional steps) by a second move command back to the original starting location. As another example, the path adjuster 326 may identify lines within the path and then segment the line to include multiple lines of variable length. The appearance of the line, once rendered, will not change, but the instructions associated with the path will be different, and therefore may prevent an attacker from analyzing paths to determine corresponding characters within the instructions. Further obfuscation techniques may also be applied by the path adjuster 326, such as changing an ordering that parts are drawn in, changing start and end points, and the like.

In one or more embodiments, a set of paths may be generated and then stored for each of the characters, where one or more paths for the set are selected or used for each of the segments. By way of example, a predetermined number of paths may be assigned to different characters. When that character is used within a segment, one or more of the predetermined numbers may be selected and used within that segment. Such a process may enable offline populating of different sets of paths and then pre-processed or on-demand selection of paths within segments. Furthermore, a number of different font files may be generated and then one of the font files may be selected for transmission, where the font file may include different sets of glyph IDs, different sets of paths, or a combination thereof.

Embodiments may further include an encryption module 328 that may provide one or more levels of encryption to the instructions prior to transmission to the device 302. The encryption, when the data is viewed on a browser, may prevent or block an attacker from using web inspector tools to see content as clear text, for example when accessing a debugger associated with the browser. As noted above, one or more properties of the device or the user account may be associated with a key to encrypt and decrypt the instructions. In one or more embodiments, viewing of the content may be transient, with potentially short-lived HTTP sessions, so encrypted content may be transmitted with all necessary information to decrypt the content within the same session. In one or more embodiments, a combination of cookie-based information (e.g., custom ID, session ID, etc.) or content metadata (e.g., ASIN) may be utilized to derive encryption keys at runtime. By way of example, an algorithm may utilize this information with a series of operations (e.g., hashing, bye rotations, permutations, XOR, magic bytes, etc.) to device the encryption key. In at least one embodiment, encryption techniques may be rotated on a periodic basis in the event one technique is compromised. It should be appreciated that various embodiments may incorporate the encryption module 328 within the data protection module 318.

As noted above, in various embodiments, the content provider environment 306 may also serve as an intermediary for preparing instructions for rending content received from one or more third party resources 330. For example, the third party resources 330 may provide content over the network 304 for preparation of instructions within the content provider environment 306. Furthermore, the third party resources 330 may also correspond to other data bases or structures associated with the provider, and it should be appreciated that the content data store 312 or other features may not all be within a common environment, but may be in data communication with the environment 306.

In operation, a user may submit a request to access content that may be associated with a user account, such as an e-book that the user purchased through a provider. Upon determination that the user is authorized to access the content, the content may be retrieved and formatted according to one or more content, user, or device properties. In at least one embodiment, the entirety of the content may not be transmitted or prepared for transmission responsive to the request. For example, a set quantity may be prepared for transmission, with additional portions being prepared as the user consumes the content. In this manner, data transmission and processing may be reduced. It should be appreciated that the portion to send may be particularly selected, and may vary based on a number of factors, such as the type of content being transmitted, user preferences, network capabilities, and the like. Instructions may be generated to enable the user device to render the content, where the instructions may include glyph IDs corresponding to characters (for text content) as well as corresponding paths for rendering the content mapped to the particular glyph IDs. In one or more embodiments, the instructions are encrypted prior to transmission to the user device. Furthermore, prior to transmission, the instructions may be modified such that glyph IDs are randomized over various sections of the content and to add noise or other obfuscation to the paths to prevent an attacker from analyzing and reverse-mapping characters to glyph IDs or paths. In this manner, multiple layers of security may be applied to the instructions for rendering the content, thereby reducing a likelihood that an attacker will proceed with an attempt at unauthorized access or unauthorized use due to the time and resources required to do so.

Figure 4:
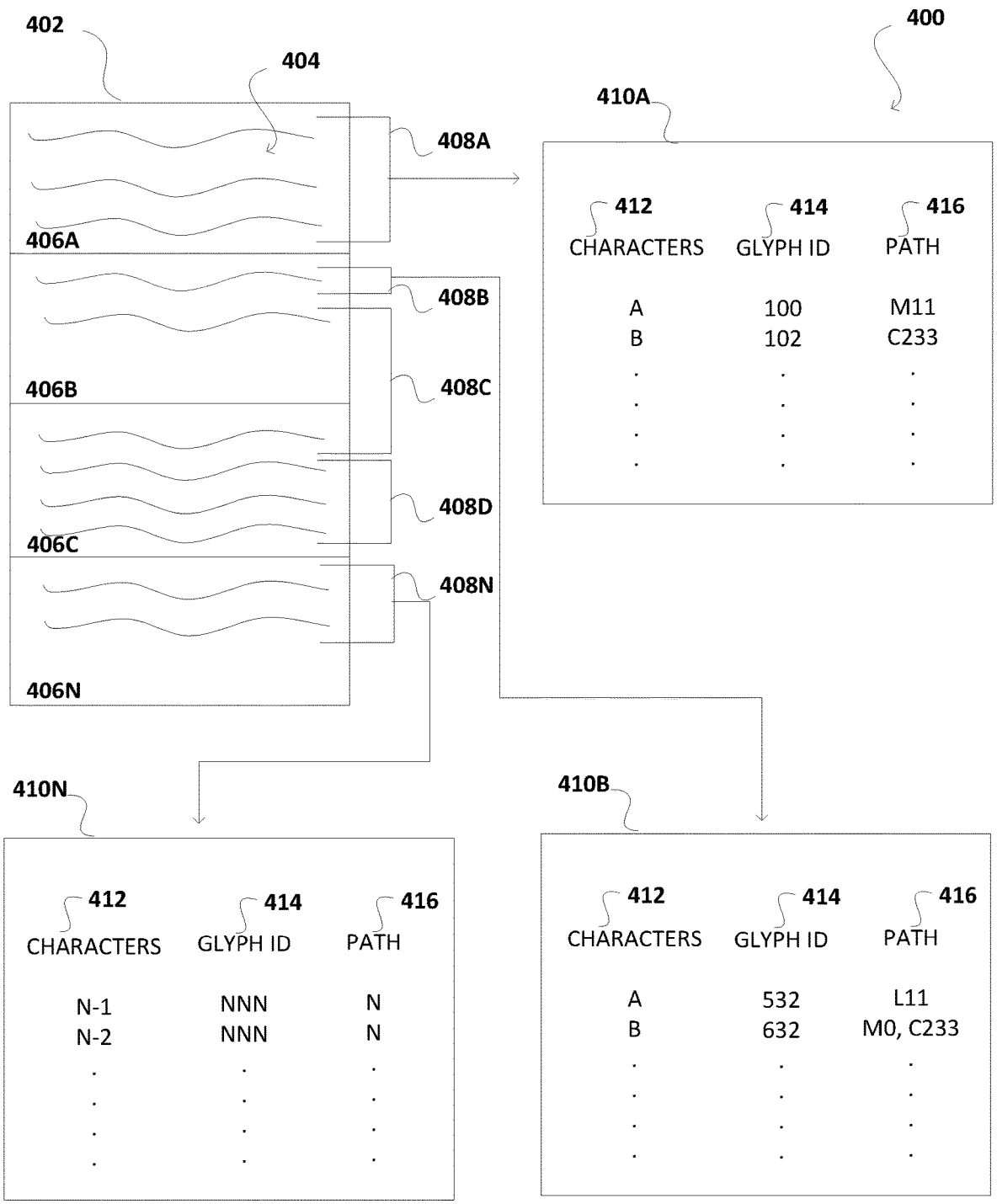
FIG. 4 illustrates an example character mapping in accordance with various embodiments.

FIG. 4 illustrates an environment 400 in which embodiments of the present disclosure may be practiced. In this example, content 402 is selected for transmission to a user, for example responsive to a request. The content 402 includes text 404 and is separated into sections 406A-406N. The sections 406A-406N may correspond to page numbers, blocks of text, sections, or any other method for segmenting the content 402. As noted above, the content 402 illustrated in FIG. 4 may be a portion of an entirety of content requested by the user, where only portions are transmitted to reduce bandwidth usage, among other benefits.

In this example, the content 402 is divided into different segments 408A-408N, for example using a content segment generator. As illustrated, the segments 408A-408N may vary in length (e.g., size, number of characters within a segment, etc.) and may extend across different sections 406, or be entirely within a single section 406. For example, the segment 408A includes three lines of text and is entirely within section 406A, the segment 408B includes a single line of text and is entirely within section 406B, and the segment 408C includes two lines of text and spans across sections 406A and 406B. It should be appreciated that the number of segments 408 and their lengths may vary based on a number of factors, such as a user selection, the content, or the like.

A mapping 410 is generated for each segment 408. In this example, and as noted above, the mapping may include characters 412, glyph IDs 414, and paths 416, among other features. In this example, the glyph IDs 414 vary between the independent mappings 410. For example, the mapping 410A corresponds to segment 408A and the glyph ID for character "A" is 100. However, the mapping 410B corresponding to segment 408B illustrates the glyph ID for character "A" as 532. Similarly, the paths 416 may also be different, as illustrated in FIG. 4. The user device may receive the instructions for rendering and be able to quickly render the content. In contrast, an attempted unauthorized user would evaluate each segment 408 individually in an attempt to develop the mapping in order to reproduce the content. By varying the size and number of segments 408, more resources and time may be required by the attacker, which may disincentive attempts to gain access.

As noted above, the glyph IDs within the various mappings 410 may be determined on demand (e.g., in real or near real time) or may be pre-processed and stored. Additionally, the glyph IDs may be randomly selected, selected from a preset list of corresponding glyph IDs, or a combination thereof. For example, mappings for certain sections may include sections from the set while mappings for other sections may be randomly selected. In at least one embodiment, when a character is identified within a set, a table may be evaluated to determine potential glyph IDs corresponding to the character and, in certain embodiments, to determine potential paths corresponding to the character. The glyph ID and/or path that is eventually selected may be randomly selected from the respective sets. As a result, various different combinations may be presented within the different mappings. Moreover, as illustrated in FIG. 2B, various mappings may include alternatives for different characters, such that characters may be mapped to multiple different glyph IDs and/or paths. Additionally, in one or more embodiments, font files may be selected for transmission, which may include portions of mappings to enable rendering on a user device.

Figure 5:
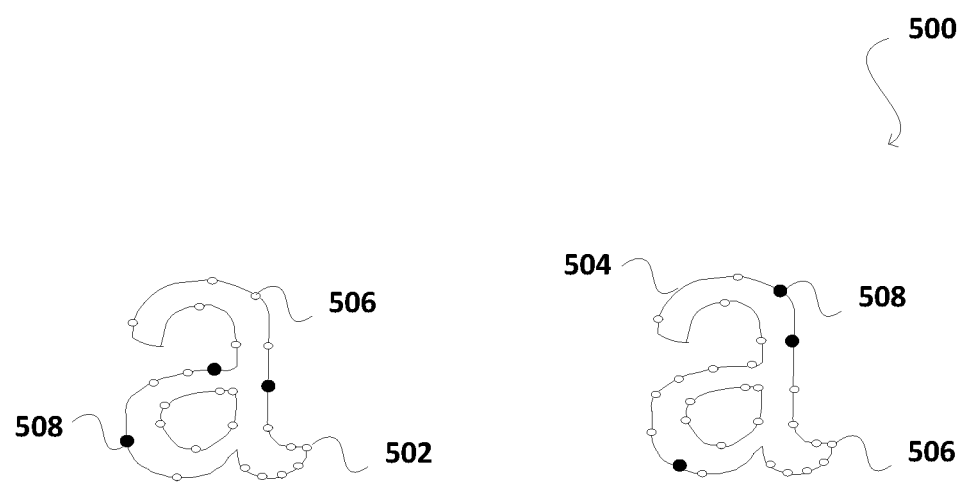
FIG. 5 illustrates an example path mapping in accordance with various embodiments.

FIG. 5 illustrates an environment 500 including characters 502, 504 to be rendered by a user device for presentation on a display. In this example, the characters 502, 504 include curve points 506 positioned along various locations. The instructions for rendering may provide information to the user device with respect to these point 506, such as their placement and how to connect points together. As an example, a path for the character 502 may include: M211.493, 202,95 C211.493, 206.083 209.072,209,499 204, 243,213.201 to provide instructions for generating the character. It should be appreciated that this path may be an SVG path where certain commands, such as M for move or C for curve would be provided in a machine-readable fashion such that the device could render the content. In one or more embodiments, anchor points 508 may indicate starting or ending points for rendering the character. As another example, a path for the character 504, producing the same outline as character 502, may include: M488.343, 128.206L474.666, 129.06 C466.762,131.054. Additionally, the anchor points 508 may be in different positions. Accordingly, embodiments of the present disclosure may further obfuscate the rendering instructions by modifying the paths for rendering the content. Such a modification may prevent or reduce a likelihood that an attempted unauthorized user can correlate paths for different characters between sections, as the paths may be significantly different while corresponding to the same shape for the character.

Figure 6:
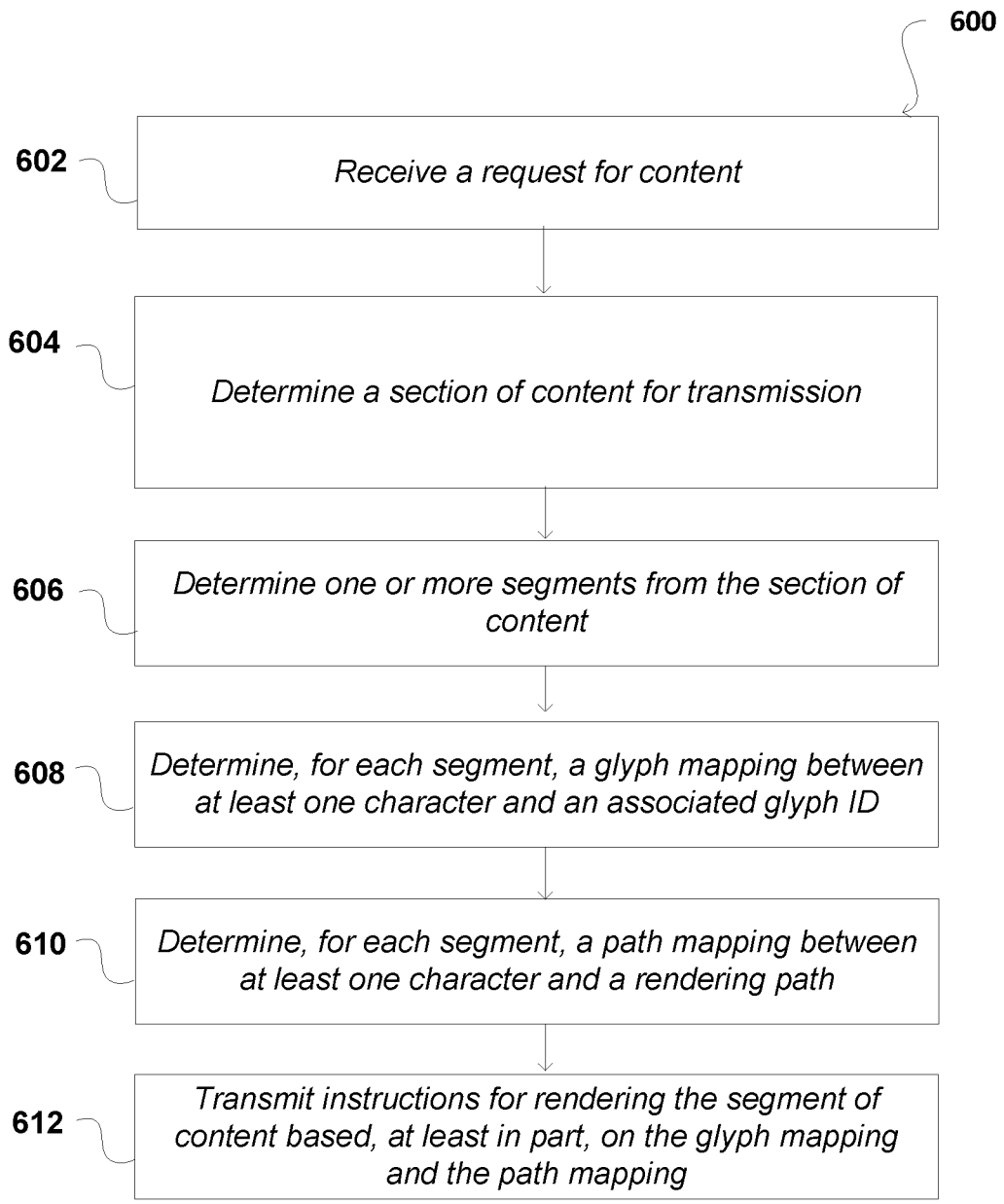
FIG. 6 illustrates a process for providing rendering instructions in accordance with various embodiments.

FIG. 6 is a flow chart of an example process 600 for transmitting instructions for rendering content. It should be understood that, for any process discussed herein, there can be additional, fewer, or alternative steps, performed in similar or different orders, or in parallel, within the scope of the various embodiments unless otherwise stated. In the example, a request for content is received 602. The request for content may correspond to a request to view content, such as text content, through a web browser or application for viewing the content. In at least one embodiment, the request is provided by a user having authorization to view the content.

A section of content for transmission, responsive to the request, is determined 604. The section of content may be less than the entirety of the content. For example, if the request is to view an entire book, the section of content may correspond to a set number of pages or a single chapter of the book. In this manner, resources and bandwidth may be conserved by not processing all of the content when the user is likely unable to utilize each portion of the content simultaneously. In at least one embodiment, the sections of content are determined, based at least in part, on one or more content properties, user properties, or device properties. By way of example, content properties may refer to a content type (e.g., book, textbook, magazine, mixed-media, etc.), user properties may include properties associated with a user account or information provided by the user (e.g., permissions, parental controls, preferences, etc.), and device properties may include information associated with the device or method of consumption utilized by the user (e.g., screen size, screen resolution, software version, etc.). In at least one embodiment, content may be divided into sections prior to receiving the request and stored as different portions of content segments. For example, popular content may be divided and prepared prior to receiving the request to enable faster response and to reduce processing on demand requests.

In at least one embodiment, one or more segments are determined from the section of content 606. For example, the content may be divided into segments according to chapters, number of characters within a segment, number of lines within a segment, or the like. The number of segments may vary based on the properties noted above or may be preset. As described herein, the segments may enable individual mappings for different portions of the content to reduce a likelihood of unauthorized access or reproduction of the content. In at least one embodiment, content may be divided into segments and stored as the content segments. For example, popular content may already be divided and prepared to be more responsive to user requests. In various embodiments, one or more databases may store different content portions divided into different content segments and, responsive to the request, at least one of the different content portions and/or different content segments may be selected. The selection of the content portion may be randomized or may be determined based, at least in part, one or more factors of the user device, user settings, network parameters, or the like.

Glyph mapping to characters within the content may be determined 608 along with path mapping for the characters 610. In various embodiments, the mappings are different between sections, such that glyph mapping for a first section is different from glyph mapping for a second section. As a result, an unauthorized user that was able to determine character mapping for one section would not be able to render the remaining content, at least without further attempting to determine the mappings for those segments. Similarly, the path mappings may also differ such that the appearance of the characters is consistent, but the order or way the characters are rendered is different. In at least one embodiment, the determination of the glyph mapping and/or the path mapping is performed on demand. In at least one embodiment, the determination of the glyph mapping and/or the path mapping is performed prior to the receipt of the instructions. For example, a set of mappings may be generated and stored, such as within a table, where a certain particularly selected number of glyph IDs and/or paths correspond to particular characters. By way of example only, the character "A" for a certain font may have five different potential glyph IDs and 3 different potential paths. Upon receipt of the request for instructions or in a pre-request preparation, one or more of the potential glyph IDs and/or potential paths may be selected for the character within a particular segment. It should be appreciated that these IDs or paths may be repeated or used in other segments or, in one or more embodiments, may be evaluated to ensure identical combinations are not repeated. As an example for an on demand case, the associated glyph ID or path may be randomly generated responsive to the request or a predetermined ID or path may be selected from a set table.

Instructions may be transmitted to the device to render the content 612, where the instructions may be based, at least in part, on the glyph and path mappings. In this manner, instructions may be transmitted to the user device to render content without exposing the text or features of the content within the instructions. In one or more embodiments, the instructions may correspond to a file, such as a text file, transmitted to the user device to perform the rendering. In at least one embodiment, the instructions may form at least a portion of a font file, which may correspond to a particular font being utilized to render the content. The font file may then be provided, along with or in place of, additional instructions for rendering.

Figure 7:
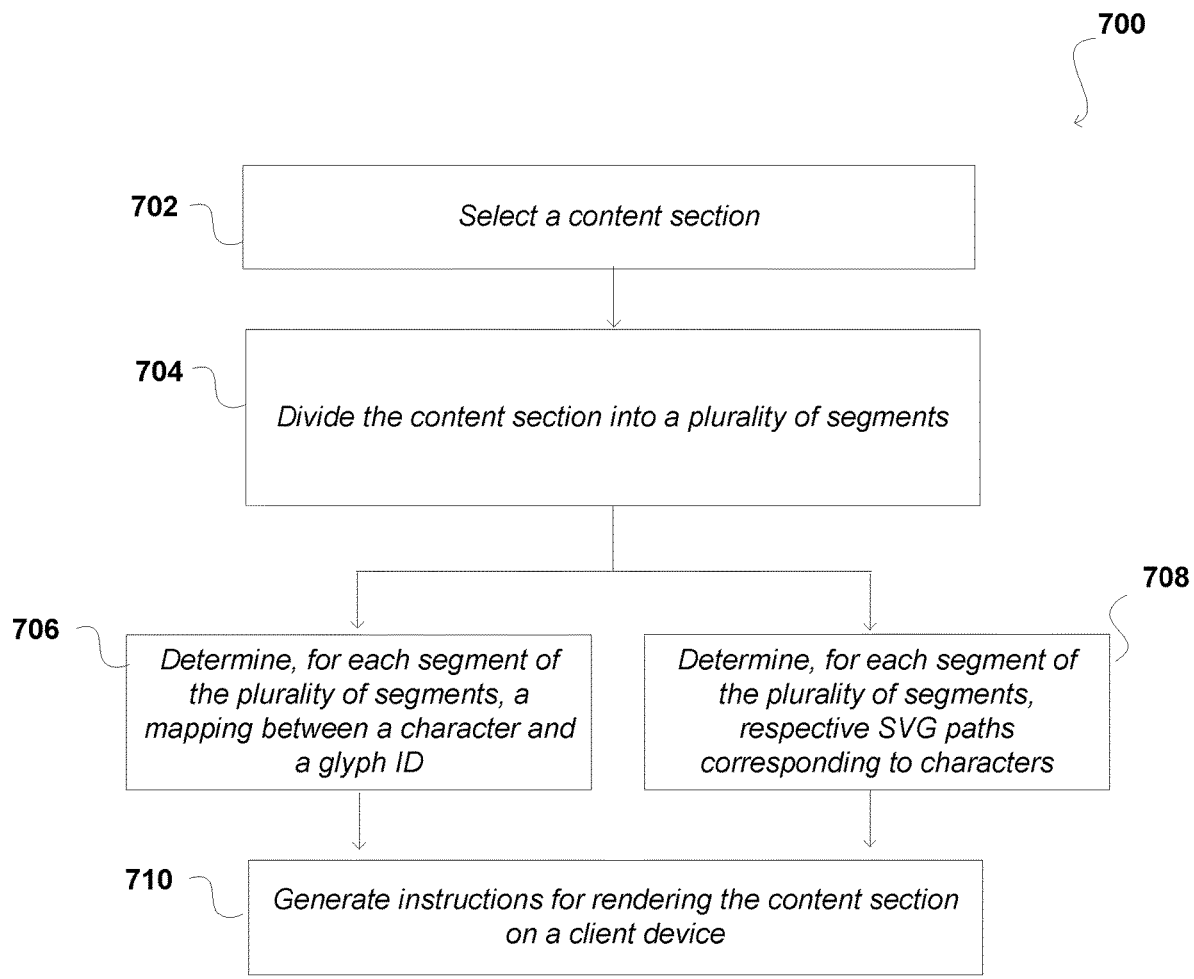
FIG. 7 illustrates a process for generating rendering instructions in accordance with various embodiments.

FIG. 7 illustrate a method 700 for generating instructions for content rendering. In this example, a content section is selected 702. The content section may correspond to a portion of a larger content element, such as a chapter or a number of pages from a book. Additionally, the content section may correspond to certain pages of a set of records, such as medical records, tax records, or the like. In one or more embodiments, the content section is determined on demand. However, in other embodiments, the content section is pre-determined or selected from a set of established content sections. That is, content may be pre-divided into different content sections and one of the content sections from a set may be selected. The content section is divided into a plurality of segments 704. For example, each line may correspond to a different segment. It should be appreciated that the number of segments may be particularly selected and may vary based on the application, among other factors. As noted above, the dividing may be performed on demand or may be selected from one or more stored divisions. For example, popular content may have one or more different options or sets of segments while less popular content may be segmented on demand. In at least one embodiment, segmenting the content may be based, at least in part, on properties of the content, properties of the user device, user settings, user information, or the like.

In various embodiments, multiple strategies may be deployed to obfuscate the instructions to make unauthorized access more difficult. In one or more embodiments, each strategy may be used in combination. However, in other embodiments, a single strategy may be deployed. In at least one embodiment, a glyph ID mapping is determined between characters and randomly selected glyph IDs 706. For example, random numbers may be generated or searched (for example within a table) and used for each, or at least some, of the characters. Moreover, each segment may have an independent mapping. In at least one embodiment, a preset or stored glyph ID for a character may be selected. For example, a table may include two or more options for glyph IDs that correspond to a single character. Determining the mapping may correspond to selecting at least one of the two or more options. Moreover, the mapping itself may also include duplicates, as noted above, to provide additional obfuscation to the rendering instructions. In at least one embodiment, mappings are established and stored, for example for popular content. However, as described herein, mapping may also be done on demand. Accordingly, it should be appreciated that the glyph IDs utilized in the mappings may not be modified or generated responsive to the request, but rather, may be selected from an existing table of potential options. However, glyph IDs may also be generated and mapped on demand.

In another embodiment, a path mapping is determined between characters and an SVG path corresponding to instructions for rendering a character 708. For example, noise may be added to the path such that characters between segments appear the same, but are rendered differently. In one or more embodiments, noise is randomly generated and inserted into various paths corresponding to different characters. The noise may be generated and the path may be modified on demand. Additionally, in various embodiments, a preset number of modified paths may be established for a given character and one or more of the present modified paths may be selected for use in rendering content within a particular segment. Accordingly, it should be appreciated that the paths utilized in the mappings may not be modified or generated responsive to the request, but rather, may be selected from an existing table of potential options. However, paths may also be generated and mapped on demand Instructions may be generated for a user device to render the content 710. In one or more embodiments, the instructions correspond to a file, such as a text document, that may be read and utilized by the user device in order to render content. In various embodiments, the instructions may also form at least a portion of a font file, where one or more paths are provided for characters with a specific font for rendering. As noted above, the font files may be preset, such that there are one or more different font files and one may be selected for use when generating and transmitting instructions to the user device.

Figure 8:
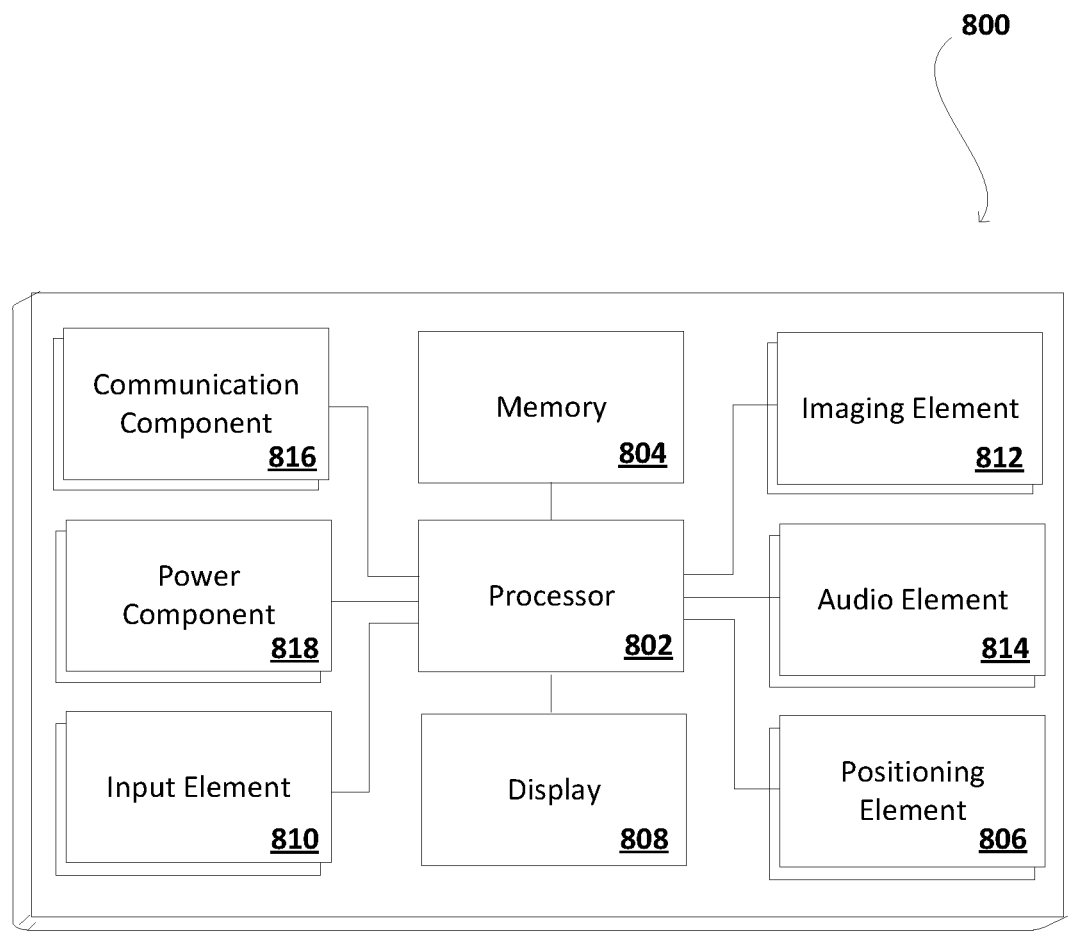
FIG. 8 illustrates example components of a computing device that can be used to implement aspects of the various embodiments.

FIG. 8 illustrates a set of basic components of an electronic computing device 800 that can be utilized to implement aspects of the various embodiments. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices. The device typically will include some type of display screen 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C #or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

Figure 9:
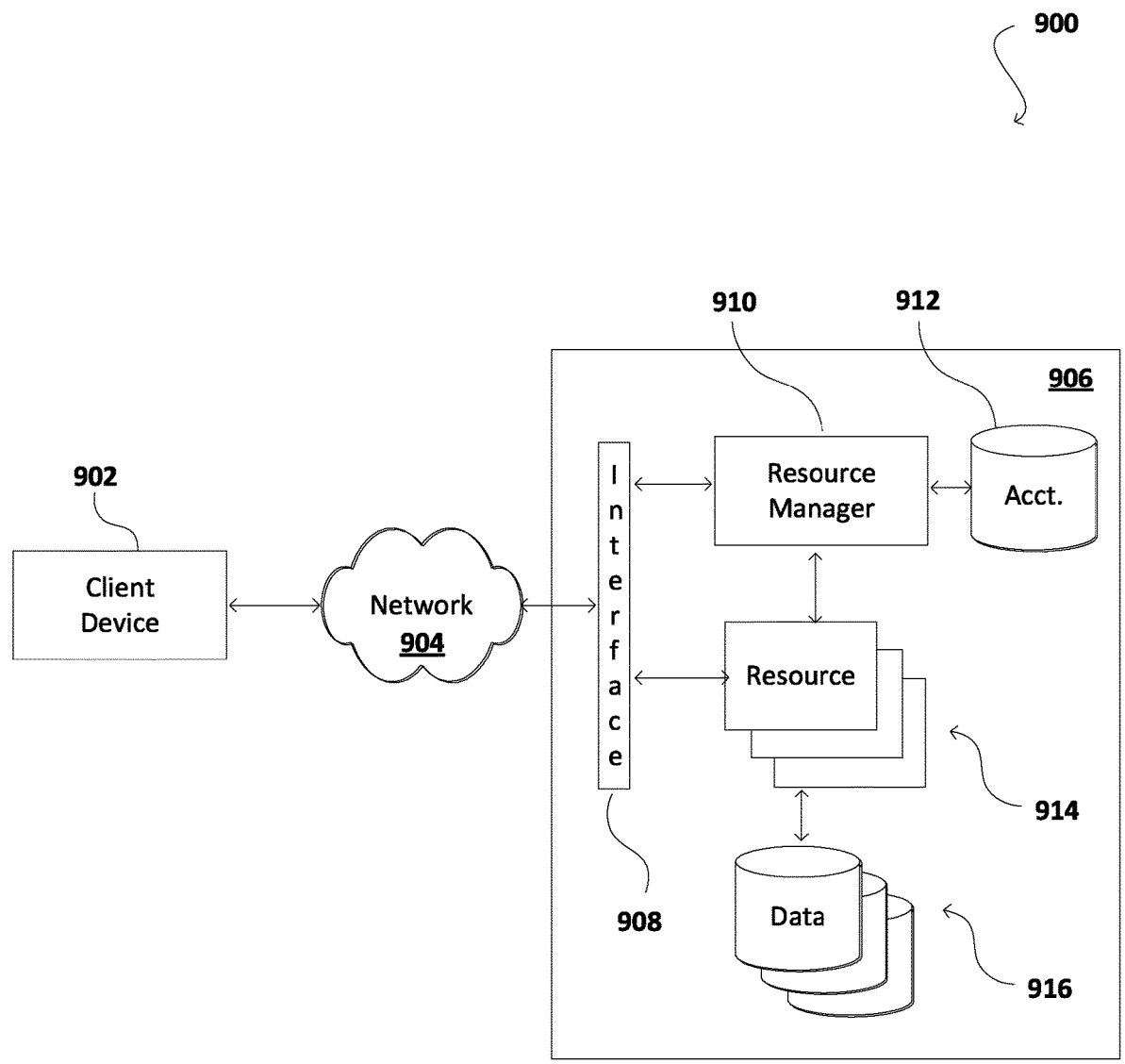
FIG. 9 illustrates an example environment in which various embodiments can be implemented.

FIG. 9 illustrates an example environment 900 in which aspects of the various embodiments can be implemented. In this example a user is able to utilize a client device 902 to submit requests across at least one network 904 to a multi-tenant resource provider environment 906. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 904 can include any appropriate network, including an intranet, the Internet, a cellular network, a local area network (LAN), or any other such network or combination, and communication over the network can be enabled via wired and/or wireless connections. The resource provider environment 906 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 914 of one or more types. These types can include, for example, application servers operable to process instructions provided by a user or database servers operable to process data stored in one or more data stores 916 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 914 can submit a request that is received to an interface layer 908 of the provider environment 906. The interface layer can include application programming interfaces (APIs) or other exposed interfaces enabling a user to submit requests to the provider environment. The interface layer 908 in this example can also include other components as well, such as at least one Web server, routing components, load balancers, and the like. When a request to provision a resource is received to the interface layer 908, information for the request can be directed to a resource manager 910 or other such system, service, or component configured to manage user accounts and information, resource provisioning and usage, and other such aspects. A resource manager 910 receiving the request can perform tasks such as to authenticate an identity of the user submitting the request, as well as to determine whether that user has an existing account with the resource provider, where the account data may be stored in at least one data store 912 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 902 to communicate with an allocated resource without having to communicate with the resource manager 910, at least until such time as a relevant aspect of the user account changes, the user is no longer granted access to the resource, or another such aspect changes.

The resource manager 910 (or another such system or service) in this example can also function as a virtual layer of hardware and software components that handles control functions in addition to management actions, as may include provisioning, scaling, replication, etc. The resource manager can utilize dedicated APIs in the interface layer 908, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 908 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving a request for content;
determining, based at least in part on the content, a section of the content for transmission responsive to the request;
generating, from the section of content, a plurality of content segments;
generating, for each content segment of the plurality of content segments, a mapping between a character of the content, an identification corresponding to the character, and a path for rendering the character, wherein the respective mappings are different for each of the plurality of content segments; and
providing, responsive to the request, instructions for rendering the content, based at least in part on the respective mappings.

2. The computer-implemented method of claim 1, further comprising:
randomly generating the identification for each character within a respective mapping.

3. The computer-implemented method of claim 1, further comprising:
selecting at least one of the identification or the path from a predetermined number of identifications or paths corresponding to the character.

4. The computer-implemented method of claim 1, further comprising:
adding noise to the path, the noise modifying the instructions corresponding to the path while producing an outline substantially similar to the path prior to the addition of the noise.

5. The computer-implemented method of claim 1, wherein the content is text content and the content is viewable on a web browser.

6. A computer-implemented method, comprising:
dividing a portion of content into a plurality of content segments;
determining, for each content segment of the plurality of content segments, a set of identifiers (IDs) corresponding to characters of the content, the respective sets of IDs for each content segment being different from one another;
determining, for each content segment of the plurality of content segments, a set of outlines corresponding to the characters of the content and the IDs, the respective sets of outlines for each content segment being different from one another; and
generating instructions for rendering the portion of content.

7. The computer-implemented method of claim 6, further comprising:
receiving, from an authorized user, a request for the content;
determining, based at least in part on one or more user properties or device properties, the portion of content.

8. The computer-implemented method of claim 6, wherein the set of IDs are randomly selected for each content segment of the plurality of content segments.

9. The computer-implemented method of claim 6, further comprising:
selecting, from a set of character mappings, one or more IDs corresponding to the characters of the content.

10. The computer-implemented method of claim 6, further comprising:
modifying one or more outlines of the set of outlines, wherein the modification changes one or more steps to generate the outline but maintains an outline shape.

11. The computer-implemented method of claim 10, wherein the modification corresponds to at least one of a phantom move, dividing a line into segments, changing a starting point, or changing an ending point.

12. The computer-implemented method of claim 6, further comprising:
transmitting the instructions for rendering the content portion on a client device;
determining, based at least in part on information from the client device, a user is within a threshold distance of an end of the content portion;
selecting a second portion of the content; and
transmitting second instructions for rendering the second content portion on the client device.

13. The computer-implemented method of claim 6, wherein the content portion is less than an entirety of the content and the rendering is using a web browser.

14. The computer-implemented method of claim 6, further comprising:
encrypting the instructions, wherein a key for the encryption is based, at least in part, on properties of a user device submitting a request for the content, on properties of a user account submitting the request for the content, or on properties of the content.

15. A system, comprising:
at least one processor; and
memory including instructions that, when executed by the at least one processor, cause the system to:
divide a portion of content into a plurality of content segments;
retrieve, for each content segment of the plurality of content segments, a different set of identifiers (IDs) corresponding to characters of the content;
retrieve, for each content segment of the plurality of content segments, a different set of outlines corresponding to the characters of the content and the IDs; and
generate instructions for rendering the portion of content.

16. The system of claim 15, wherein the instructions when executed further cause the system to:
determine, based at least in part on the content portion, a layout for the content portion.

17. The system of claim 15, wherein the set of outlines are based, at least in part, on one or more properties of a client device rendering the content.

18. The system of claim 15, wherein the instructions when executed further cause the system to:
identify a mapping corresponding to at least one content segment of the plurality of content segments; and
select, from the mapping, at least one ID or at least one outline for a character of the characters of the content.

19. The system of claim 15, wherein the instructions when executed further cause the system to:
determine, based at least in part on one or more user properties or device properties, the portion of content.

20. The system of claim 15, wherein at least one character of the characters of the content corresponds to two or more IDs or to two or more outlines.

* * * * *